US010434487B2

(12) United States Patent
Grega

(10) Patent No.: US 10,434,487 B2
(45) Date of Patent: Oct. 8, 2019

(54) APPARATUS FOR PHYSICALLY PROCESSING AND/OR HEATING MEDIA, IN PARTICULAR LIQUIDS

(76) Inventor: Samuel Grega, Presov (SK)

(*) Notice: Subject to any disclaimer, the term of this patent is extended or adjusted under 35 U.S.C. 154(b) by 386 days.

(21) Appl. No.: 14/115,101

(22) PCT Filed: May 3, 2012

(86) PCT No.: PCT/EP2012/001891
§ 371 (c)(1),
(2), (4) Date: Nov. 1, 2013

(87) PCT Pub. No.: WO2012/150031
PCT Pub. Date: Aug. 11, 2012

(65) Prior Publication Data
US 2014/0064712 A1 Mar. 6, 2014

(30) Foreign Application Priority Data

May 4, 2011 (SK) .................... 34-2011

(51) Int. Cl.
B01J 19/08 (2006.01)
B01J 19/12 (2006.01)
C02F 1/461 (2006.01)
C02F 1/48 (2006.01)
C02F 1/00 (2006.01)

(52) U.S. Cl.
CPC ............ *B01J 19/087* (2013.01); *B01J 19/12* (2013.01); *B01J 19/122* (2013.01); *B01J 19/129* (2013.01); *C02F 1/48* (2013.01); *C02F 1/005* (2013.01); *Y02W 10/37* (2015.05)

(58) Field of Classification Search
CPC ........ B01J 19/087; B01J 19/12; B01J 19/122; B01J 19/129; C02F 1/005; C02F 1/461; C02F 1/46109; C02F 1/46; C02F 1/48; F24H 1/10; F24H 1/14; F24H 1/101; F24H 1/106; F24H 1/0072; Y02W 10/37
USPC ....... 392/311, 314, 320, 407, 321, 338, 465, 392/471, 498, 500, 501, 503
See application file for complete search history.

(56) References Cited

FOREIGN PATENT DOCUMENTS

| DE | 888537 | 9/1936 |
| DE | 888537 | 7/1949 |
| GB | 2 433 267 | 3/2002 |
| GB | 2 433 267 | 6/2007 |
| MD | 4055 | 7/2010 |
| WO | WO 2007/045487 | 5/1989 |
| WO | WO 2007045487 A1 * | 4/2007 ............. F24H 1/106 |

OTHER PUBLICATIONS

Translation of WO 2007045487.*

* cited by examiner

Primary Examiner — Michael G Hoang
(74) Attorney, Agent, or Firm — John Alumit

(57) ABSTRACT

The invention relates to a method and apparatus for physically working and/or heating media, in particular liquids. The high expenditure of energy of the known methods can be avoided, with reduced environmental impact, by the hydrodynamically worked medium being exposed to polar and/or ionic electrochemical potentials and electrochemical signals RC AC.

3 Claims, 11 Drawing Sheets

APPARATUS FOR PHYSICALLY PROCESSING AND/OR HEATING MEDIA, IN PARTICULAR LIQUIDS

CROSS-REFERENCE TO RELATED APPLICATION

This application claims the benefit of the priority filing date in PCT/EP2012/001891 filed on MAY 3, 2012 and referenced in WIPO Publication No. WO2012/150031. The earliest priority date claimed is May 4, 2011.

FEDERALLY SPONSORED RESEARCH

Not Applicable

SEQUENCE LISTING OR PROGRAM

Not Applicable

BACKGROUND

The invention relates to an apparatus for physically processing and/or heating media, in particular liquids.

The pretreatment of liquid and gaseous media in technologies that work with water and with other chemical compounds (methane, alcohol, ethanol, and others), elemental substances (pure hydrogen gas, gaseous helium, and others), homogeneous compounds (air, seawater, aqueous solutions, such as saline solution, copper vitriol solution, and others), colloidal compounds (milk, blood, and others), heterogeneous compounds (suspension, emulsion, foam, aerosols), is known. These excitation devices are used in biochemistry, in petrochemical technologies, in chemical technologies, and others, in which the media are of an organic, inorganic, polar, nonpolar, natural, or synthetic type.

Present technologies that work with liquid or gaseous media (whether as material to be processed, or as adjuvant material that improves the technological conditions) are defined by energy bonds in the molecule and between the molecules. The magnitude of their decisive properties, such as fluidity, electrical conductivity, surface tension, etc., depends on those energy bonds. Because of their broad application and because they are so numerous, these technologies cannot be specified concretely within the scope of this invention. They involve liquids and gases in the full scope of their molecular composition, such as water, soda, acid, organic and inorganic liquids, hydrocarbons, in particular fuels, crude oil, gasoline, kerosene, mineral oils, liquid fertilizer, and so forth.

The technologies that have to do with the media listed, such as burning, combustion, heating, cooling, the preparation of solutions and colloids, and segregation, such as distillation, refining, evaporation, sedimentation, and the like, are energy-, time- and material-consuming.

Present technologies that require a temperature change (heating, cooling) of the medium are implemented by means of solid, liquid and gaseous fuels, electrical energy, sunlight, heat from the earth (geothermia), heat pumps, and so forth.

The disadvantage of present methods is their high energy consumption. Moreover, in combustion, fuels have adverse effects on the environment. In the case of automotive traffic, air traffic, and ship traffic, the effects are multiplied and worse.

If water is used as a heating medium or in the production of steam, for instance for driving a turbine, this medium requires complex processing in order to reduce some or all of the elements. Possible ventilation, especially because of the formation of crusts, must also be provided. In this processing, damage occurs to the surface of the technical systems, the functional surfaces of combustion chambers, and the machines, such as radiators, heat exchangers, heating equipment, and heaters.

In heating with water in accordance with the PCT application WO 2007/045487, the heating is slow, and sometimes unwanted. This reference was the subject of further research, especially because of unexpected interactions in the type of heating, which was directed to changes in the treated medium. The physical changes found led to use in further implementation, such as in distilled water, demineralized water, geothermal water, alcohol, oils, gases, crude oil, gasoline, kerosene, methane, biogas and other media named in the aforementioned application.

In U.S. Pat. No. 4,427,544, a magneto-electrochemical reactor for water preparation is described, which is located on a nonmagnetic pipeline having an inlet and an outlet. A DC source is mounted on the outside of the pipeline. In the interior, there is a rotating turbine, which is disposed on ferromagnetic rods that are supported in the pipeline. The rotating turbine generates electric current, which acts on the formation of lime in the pipeline and which, in energy equipment and heat exchangers, forms a protective layer that prevents crusts from forming.

U.S. Pat. No. 5,384,627 shows a method and an apparatus for electrolytic treatment of materials; the material to be treated is stored in an electrolyte on which an electromagnetic field acts. On the surface of the material to be treated, this field triggers electromagnetic and electrokinetic forces, which are capable of generating chemical and physical changes in the material to be treated. This involves, for one thing, a reactor, supplemented with an electrolyte, that has treatment materials, such as ions, acids, bases, and the like, with an optimal pH value, and also has a takeup electrode or a mixing device and a reducer. The reactor has a number of possible embodiments, and the takeup electrode is connected to a cathodic metal. This method is employed for cementing the surfaces of the material to be treated.

U.S. Pat. No. 4,061,551 shows a method for extracting gallium from alkaline solutions. This involves a method for obtaining gallium from solutions for further use, for instance, as components for semiconductor elements of thermometers and the like. It also involves an apparatus, which comprises a container with an anode and a liquid metal cathode, and the electrolyte contains a gallium solution. An electromagnetic field speeds up the displacement of gallium from alkali electrolytes to the electrodes.

US Patent Application 2007/0029261 shows a method and an apparatus for water preparation by electromagnetic waves for the sake of removing lime. It involves part of a pipleline with an electromagnetic induction winding, which is connected to the source of the electromagnetic signal. The electromagnetic field is generated in the interior of the pipeline.

German patent disclosure DE 888537 shows a method for separating solids out of solutions, in order to avert the formation of deposits on the heating and cooling bodies in conjunction with an anode and a cathode. The technology is implemented using the action of magnets, whose magnetic fields, whether DC or AC, are generated or formed by a permanent magnet. In an alternative embodiment, the effect is augmented with a high-frequency field.

British patent GB 2 433 267 shows an apparatus with an electrostatic electromagnetic field and an induction field.

This involves an electrostatic reduction device, with a combined electromagnetic generator that is connected to a winding. The winding is formed on the outside over the entire circumference of a container in which a reactant is disposed. The AC generator is connected in the container to the AC electrode. The AC generator is connected to the base of the container, and the reactant has both a liquid and a solid aggregate state.

Moldovan patent disclosure MD 4055 shows a method and an apparatus for softening natural mineral water. In the apparatus, there is a separate chamber for affecting water by means of a hollow cathode with a water inlet. The cathode is disposed on a winding, which is connected to a converter, a source of high-frequency magnetic impulses. The water treated by the cathode can be let out through a valve. However, the water can also flow in the opposite direction over the outer circumference of the cathode and be let out via a second, continuous outlet. Between the anode and the cathode is a ceramic membrane; a separate anode chamber has its own inlet and outlet and is connected to the positive pole of a DC source. The negative pole of the DC source is connected to the cathode. This disclosure also describes the parameters for the electrochemical treatment of the mineral water in that apparatus.

The common objective of all the aforementioned documents is to prevent the formation of a crust on the pipelines by the action of a magnetic or electromagnetic field on the water, in conjunction with static or moving components in the flow direction. A further group of documents relates to the changes upon the takeup of negative and positive ions by electrodes, or the material to be treated with an enrichment of the surface with these elements, with the goal of achieving cementation or the formation of an antioxidation protective layer, or the recovery of elements from the solutions (electrolytes).

The object of the invention is the processing of a medium, whether in liquid or gaseous form, in order to alter changes in force and energy in the molecule and between the molecule and the medium, changes that are the cause of physical and/or chemical properties of the medium.

SUMMARY

The essence of the invention is that a hydrodynamically processed medium, in a liquid and gaseous state, is subjected to polar and/or ionically electrochemical potentials and to electrochemical signals RC AC. It suffices if at least some of the medium is pretreated, prior to being subject to physical, biological, chemical, biochemical and other technologies.

In one embodiment, before introduction to physical, biological, chemical, biochemical and other technologies, the entire contents of the medium are processed in an excitation device. The best method for processing provides that the medium is intentionally passed more than once, or multiple times, through the body of the excitation device. The essence of the invention further comprises that in the body of the excitation device, at least one controlled electrode is connected to a frequency source. This frequency source is connected to an energy source. In the direction of the forced flow of the treated medium, or by means of the flow triggered by temperature changes without a forced flow, a polarization and/or ionization chamber follows, which is formed of various electrochemical potentials. Technically, it is simplest if these electrochemical potentials are formed on a body of standard dimensions on its inner circumference and/or on its axis. The advantage of this method for physical processing, and of the excitation device and its connection, is that the physical changes and their control are greater. Moreover, the heating and expansion of the excitation device's implementation to technologies, in which it brings unexpected effects, is sped up, for instance, if the method is employed as an interactive node for heating. In that case, the excitation device, in conjunction with conventional technologies, speeds up the heating and increases output from the heating devices (boilers) and reduces emissions, which has positive effects on the environment. In combination with other technologies, it acts as a catalyst, especially in the fields of organic and inorganic chemistry, petrochemistry, natural gas, crude oil, fuel processing, papermaking, water purification, energy economy, etc. The effect described is achieved in that the bonds in the molecule and between the molecule and the medium are altered, and in the case of liquids, their fluidity and surface tension change, similar to what happens with gases. They become thinner as a result and have weaker bonds, which lead to a change in their physical and chemical properties (the heat content/enthalpy changes), such as evaporation, heating, cooling, drying, mixing, etc., and to changes in chemical, physical, biological and bioenergetics reactions.

DRAWINGS

The invention will be described in further detail in conjunction with the accompanying drawings. In the drawings:

FIG. 1 schematically shows an excitation device for liquids and gases;

DESCRIPTION

Figure 1:
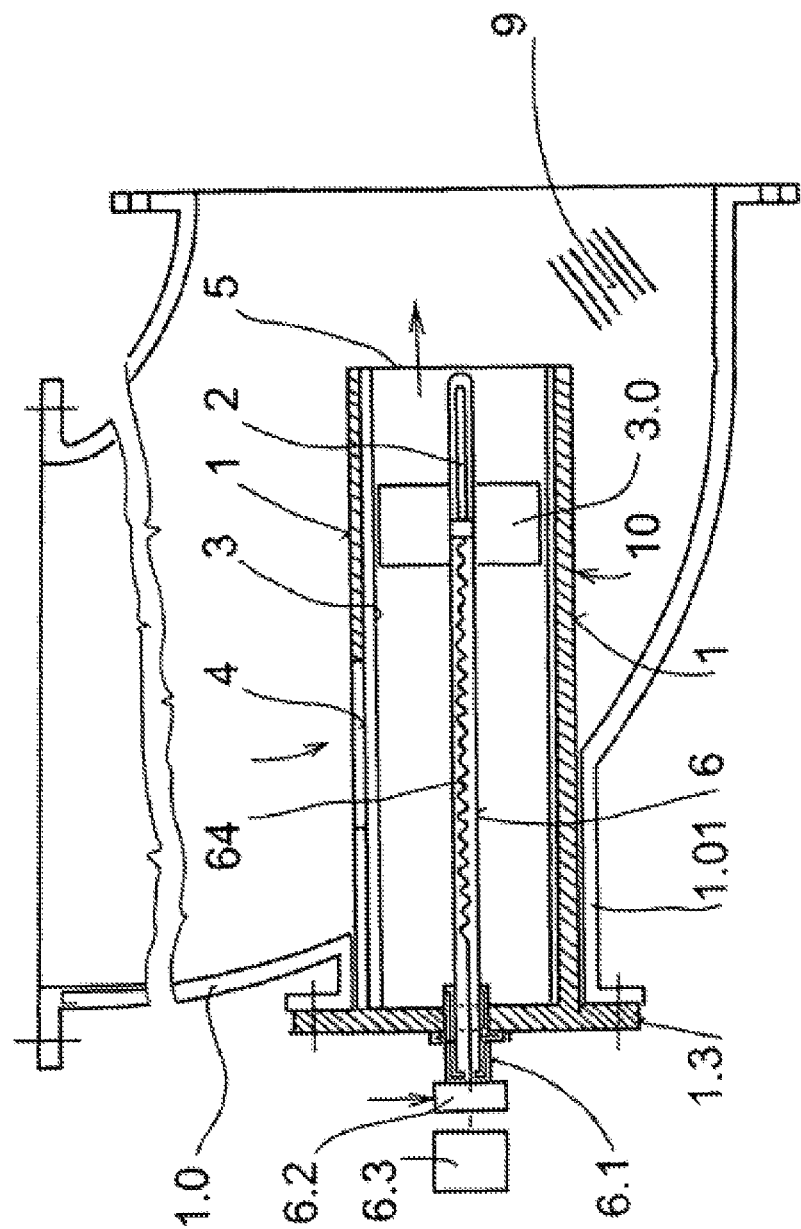

The invention will be described in further detail in terms of an exemplary embodiment of an excitation device shown in FIG. 1.

In a body 1, an excitation device 10 for liquids and gases has at least one controlled electrode 6, which is connected to a frequency source 6.2 that is connected to an energy source 6.3.

In the direction of the forced flow of a treated medium 9 or by means of a flow triggered by temperature changes without a forced flow, a polarization and/or ionization chamber that is formed of various electrochemical potentials follows. Technically, it is simplest if, in the body 1 of standard dimensions, these electrochemical potentials are formed on its inner circumference and at its axis. In a hydrodynamic flow of the medium in the body, the excitation device 10 for liquids and gases, according to the invention, processes only a portion, or the entire volume, of the medium 9 by physical means, such as with electrochemical signals RC AC and with different electrochemical potentials in the body in polar and/or nonpolar ionic fashion, which determines the type of change in the medium 9. If the electrochemical potential that is located in the body 1 has an insulation layer 3.0, for example in the form of silicate, Teflon, PP-film and PPR film at its surface, or a layer applied in a vacuum, for example, the effect involved is a polarizing effect. If this insulation layer is only part of the electrochemical potential of the electrodes and a portion of its surface is in contact with the treated medium 9, then the effect involved is an ionizing effect. The activation excitation device 10 for liquids and gases shown is then used in an existing, old pipe system. If there is a change in the flow, a flange is preferably secured retroactively in the curve 1.0 from its axis or in the vicinity thereof; a body 1 of insulating material, such as polyethylene, polypropylene, glass, silicate ceramic, or material with a zero electrochemical potential (platinum) is detachably secured in the curve 1.0 through an opening in the body 1, preferably round in shape, and is closed by a closure plate 1.3 of insulating material. At the location of the flow of the medium 9, the body 1 laterally has an inlet opening 4, and in its axis it has an outflow opening 5. On its inner surface, in this specific exemplary embodiment, the body 1 has a negative electrode 3 in the form of a coating film or the like.

In an alternative embodiment, at least a portion is covered by a peripheral insulation layer 3.0. In the vicinity of the axis of the body 1, or directly in the axis, in the closure plate 1.3 a holder 6.1 with the controlled electrode 6 is secured in watertight (media-tight) fashion; a transmission device 64 in the form of a rod or spiral is disposed in the electrode and in this way inserted into a silicate, silicon and/or quartz glass pipe. The transmission device 64 is connected by one end detachably or solidly to the frequency source 6.2, which is connected to the energy source 6.3. The energy source 6.3 can be designed as a 230 V/50 Hz distributor network, for instance, or as a photovoltaic module, a battery, or the equivalent. The integrated controlled electrode 6 (FIG. 12), on its end, has a positively polarized electrode 2, for example, which is disposed in the common silicate pipe and is separated from the controlled electrode 6 by an air gap or an insulating material with minimal thermal expansion and/or a nonpolar elastic material. The positively polarized electrode 2 is formed of C, Ag, Au, or the like, for example, or comprises mixtures thereof or compounds with other elements. In an alternative version, there is a coating, an insulation layer 2.1 of positive and/or negative electrochemical potential, on the silicate pipe of the controlled electrode 6 and or of the positive electrode 2. In this way, the medium 9 comes into direct contact with the coating, that is, the insulation layer 2.1, and is ionized.

Further versions of the controlled electrode 6, the positive electrode 2, and the negative electrode 3 are shown in FIGS. 7-12.

Figure 2:
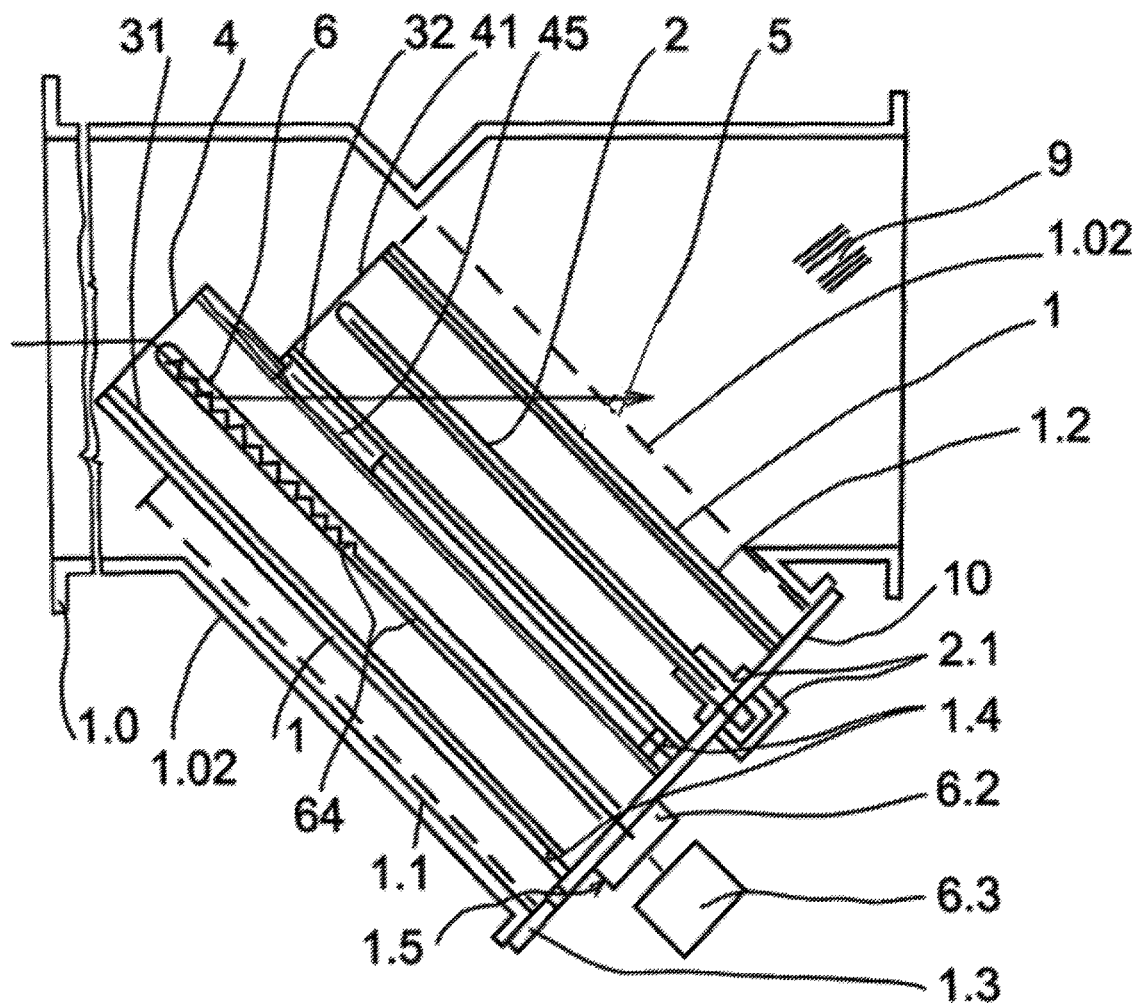
FIG. 2 shows an excitation device built into the cleaning module of a pipe system.

A further version (FIG. 2) of the general provision recited in PCT application WO 2007/045487 provides that at least some of the medium 9 is processed physically in the body 1, for instance by means of an electrochemical signal RC AC and various electrochemical potentials in the hydrodynamic flow of the medium 9 in its polarizing and/or nonpolarizing effect in the body 1, which is inserted retroactively, for instance into a dirt filter having a curve 1.0 which is a component of the pipe system. This is a version in which the technology is implemented in a linear flow of the medium 9. The excitation device 10 for liquids and gases comprises one chamber of the controlled electrode 6 of the body 1 and one chamber of the positively polarized electrode 2 of the body 1. A primary inlet opening 4 is located in the axis of the integrated body 1 of the chamber of the controlled electrode 6. The chamber of the positively polarized electrode 2 has a lateral outlet opening 5 as well as an auxiliary inlet opening 41. The chamber of the controlled electrode 6 and the chamber of the positively polarized electrode 2 are linked to each other in the body 1 via a communication opening 45. A positively polarized electrode 2 is disposed directly in the axis of the integrated body 1 of the chamber of the controlled electrode 6, or in a silicate pipe, preferably of technical glass. The body 1 comprises a first body 1.1, which forms the separate chamber of the controlled electrode 6, and a second body 1.2, which forms the separate chamber of the positively polarized electrode 2. These chambers communicate with one another through a closure plate 1.3. The transmission device 64 disposed in the silicate pipe is connected solidly and/or detachably to the frequency source 6.2, which is connected to the energy source 6.3. Similarly to the controlled electrode 6, the positively polarized electrode 2 is also disposed via a holder 21 on the body 1 in the closure plate 1.3, which is detachably secured to the flange. The body 1 is provided with sludge openings 1.4 and an outer closable drain opening 1.5. On the circumference of a body 1 that is so embodied, there is a cylindrical filter 1.02.

Figure 3:
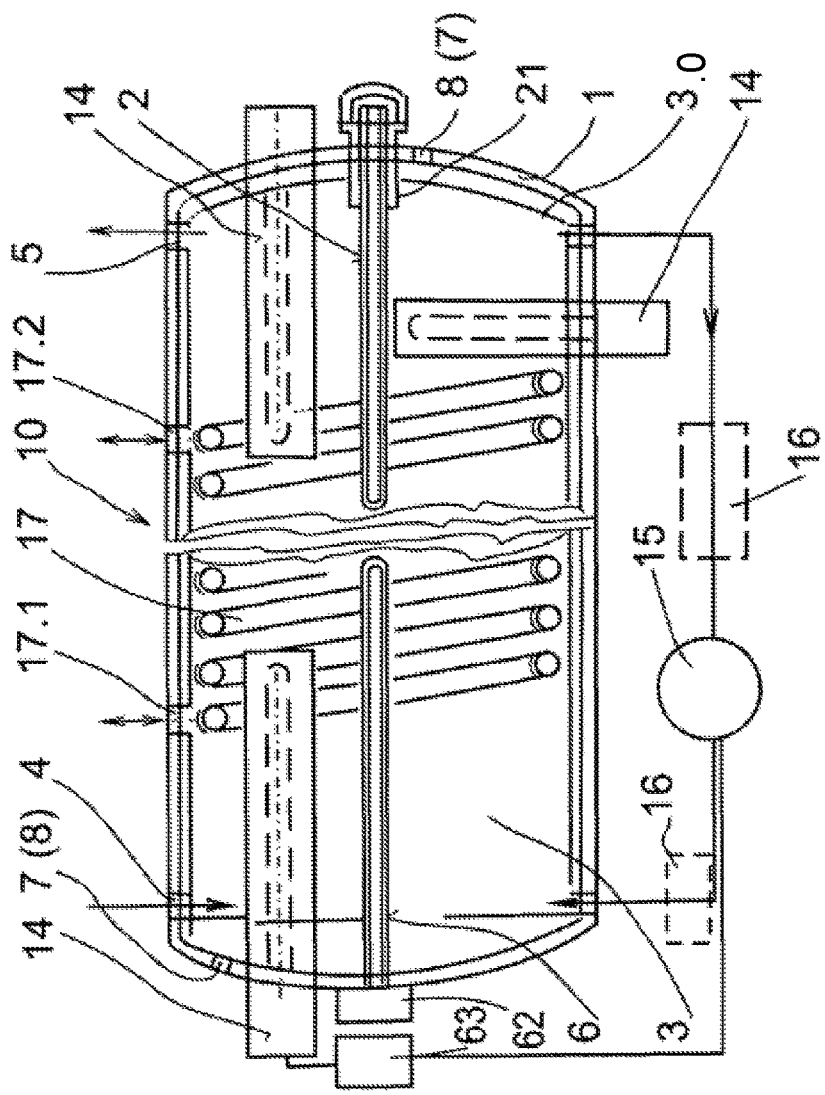
FIG. 3 shows an excitation device with a heat exchanger and a conventional heating module.

The version for processing the medium 9 with multiple passages through the excitation device 10 with hydraulic and electrical connection, through which heating is achieved, is shown in detail in FIG. 3. The body 1 has at least one controlled electrode 6 and at least one positively polarized electrode 2. In this version, if the body 1 is made of an insulating material, a negative electrode 3 is located on its inner surface. In an alternative polarized version, the body 1 has a peripheral insulation layer 3.0 on the inside circumference, or on only a portion thereof (see the right and left parts of the body 1). In the interior of the body 1, there is at least one conventional heating module disposed in watertight fashion, or at least one heat exchanger 17. The controlled electrode 6 is connected to the frequency source 62, which is connected to the energy source 63. The energy source 63 is connected electrically to a conveyor feed device 15 of the medium 9 and a conventional heating module 14 and its equivalents (laser, induction heating, and the like). The conveyor feed device 15 communicates by its outlet with the interior of the body 1, at points where at least one controlled electrode 6 is located. The input into the conveyor feed device 15 from the chamber of the body 1 takes place at points where at least one positively polarized electrode 2, which is located. The interior of the body 21 has a heat exchanger 17 with an inlet opening 17.1 and an outlet opening 17.2. These openings can also have a kinematic reversal. They are inlet-outlet openings. In an alternative version, a secondary excitation device 16 can be connected upstream and/or downstream of the conveyor feed device 15. The body 1 has a closable air/gas exhaust 7 and a closable sludge drain 8. If the body 1 is placed horizontally, these openings are located on the upper and lower wall of the body 1. The excitation device 10 mentioned, shown in FIG. 3 without a hydraulic connection and without a heat exchanger 17 and heating module 14, can be used for processing the medium, specifically with a single passage of the medium 9 prior to the physical, chemical, biochemical, biological and other technologies.

Figure 4:
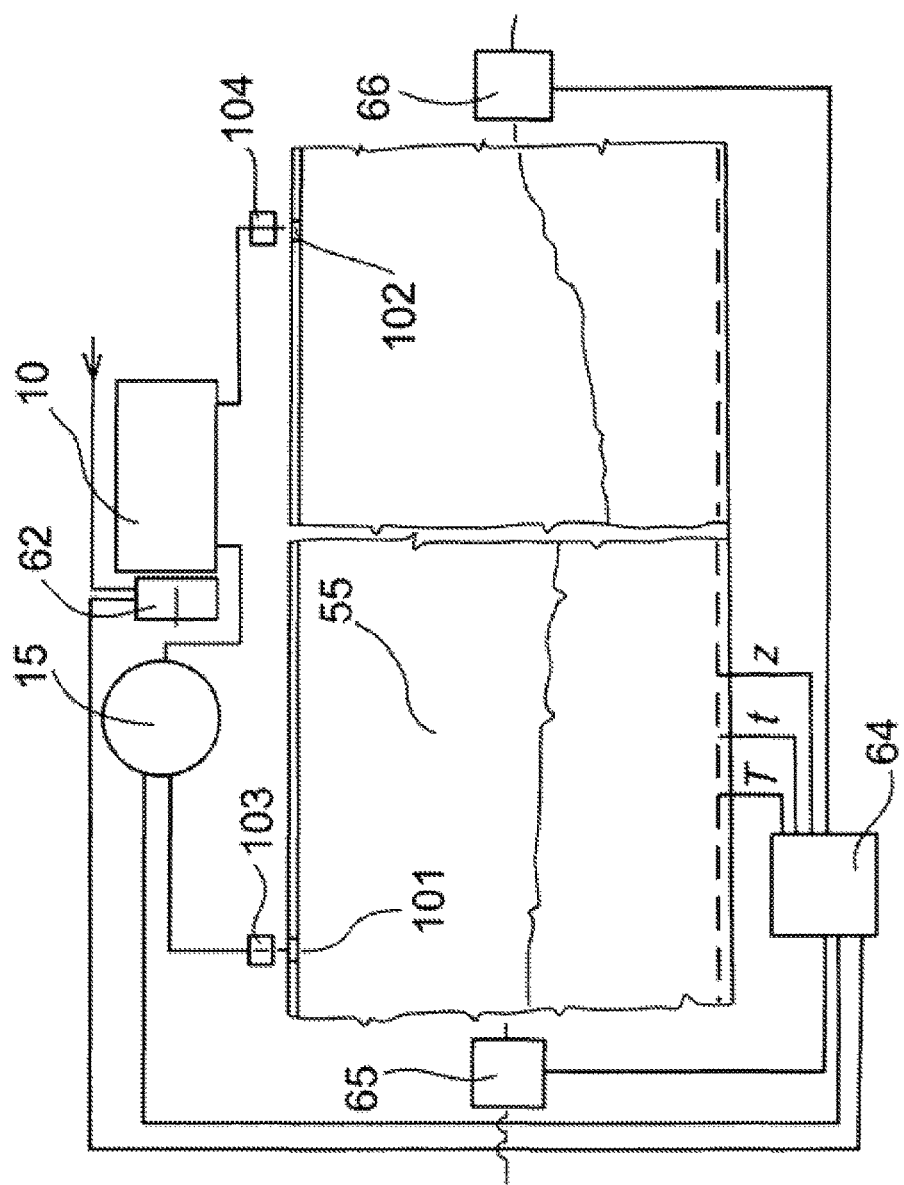
FIG. 4 shows a variant connection of the excitation device to large-diameter pipelines.

A further version of the excitation device 10 is shown in FIG. 4. It shows an arrangement on a large-diameter pipeline for carrying large quantities of the medium 9 while minimizing the execution time. The hydrodynamic chamber 55 forms a part of the pipeline 100, onto which an inlet opening 102 and an outlet opening 101 are fitted in water-tight fashion. It is advantageous to install closing and opening devices 103 and 104 on these openings. The closing and opening device 103 for the medium 9 is disposed on the outlet opening 101. The conveyor feed device 15 is connected to the inlet of the excitation device 10, whose outlet pipeline communicates with the inlet opening 102 via the closing and opening device 104. The electronic frequency source 62 communicates on the one hand with the controlled electrode 106 and the energy source 63 and on the other with the control module 64. The control module 64 is connected not only to the conveyor feed device 15 but also to a first continuously or incrementally operating electronic closer/opener 65 and a second closer/opener 66. The frequency source 62 is connected to the energy source 63 for AC or DC. The control module 64 is connected for example to a first measuring instrument T (for temperature, for instance), a second measuring instrument t (for pressure, for instance), and a final measuring instrument z (for conductivity, pH, and the like, for instance). The conveyor feed device 15 is preferably a pump of any kind and its equivalents, but in the case of cases also a suction pump, ventilator, compressor, and equivalents thereof. The variant of the aforementioned connection at a lower technical level does not have any first and second continuously or incrementally operating closers/openers 65, 66.

Figure 5:
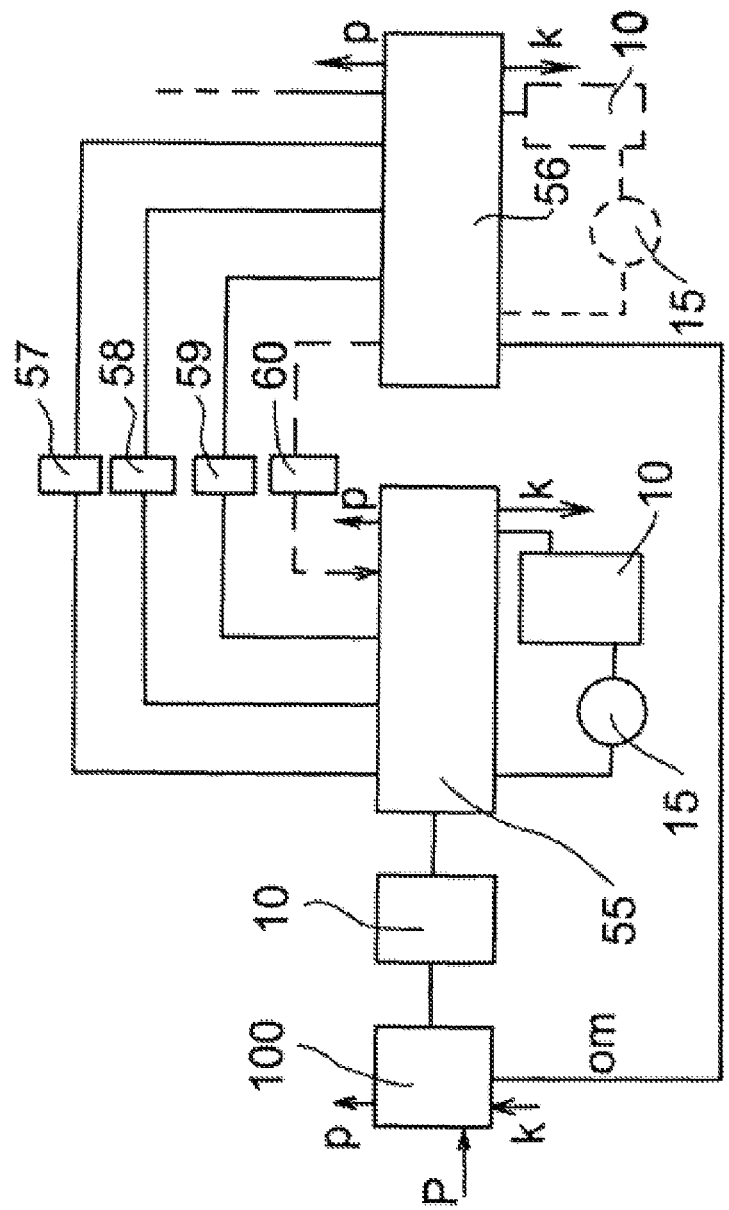
FIG. 5 shows a variant connection of the excitation device to a chamber having a mixer of a redistributor.

A further connection plan with two excitation devices 10 in the heat generation system with a boiler 100 is shown in FIG. 5. The first excitation device 10 communicates via a pipeline with the chamber 55, which in a concrete embodiment forms a mixing device or a pressure regulator or its equivalent. In this way, the conveyor feed device 15 of the medium 9 is connected to the connecting pipeline. An excitation device 10 may, but need not necessarily, be installed upstream of the boiler 100, but only in the event that the hydrodynamic chamber 55 is disposed at a distance from the boiler 100. The boiler 100 has an inlet P for the incoming medium 9, an outlet for the heating medium OM and usually a gas outlet p, as well as a sludge outlet k and an outlet for impurities. The outlet from the boiler 100 communicates with the distributor chamber 56, whose outlet communicates with a first technical block 57, such as a heating block. The second outlet communicates with a second technical block 58, such as a solvate block for an eco-washing and dry cleaning system. A third outlet from the distributor chamber 56 is connected to a third technical block 59, for instance for heating swimming pool water. The technical blocks 57, 58, 59, 60 etc. are equipped to supply the needs of an entire facility, such as a hotel, office building, factories, and the like. The hydrodynamic chamber 55 and the distributor chamber 56 also have the outlets p and k. The final technical block 60 is the last outlet that communicates with the distributor chamber 56, and its outlet communicates with the hydrodynamic chamber 55 via a mixing device or its equivalents.

Figure 6:
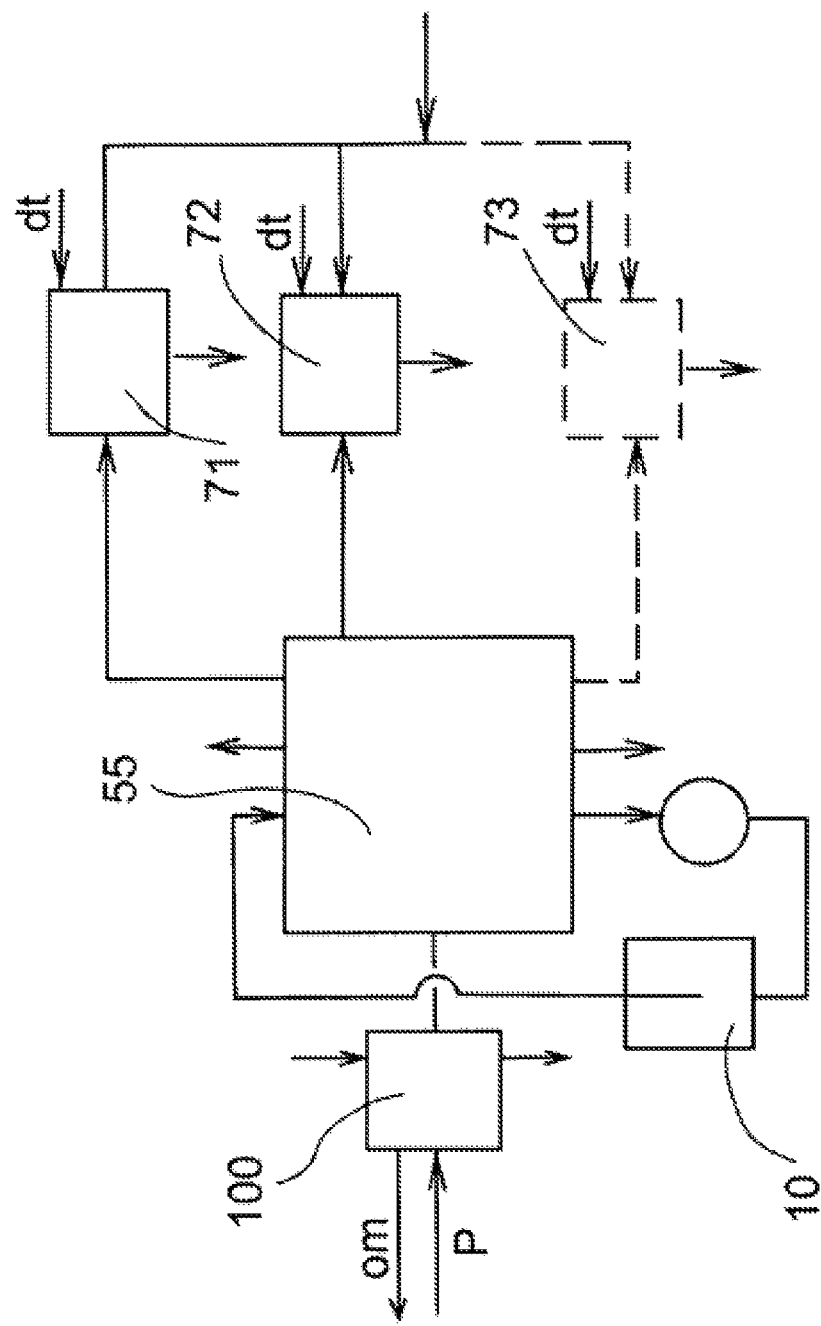
FIG. 6 shows a variant connection of the excitation device to a chamber that has biological, chemical and other technological devices.

FIG. 6 shows a general connection of the excitation device 10 to a hydrodynamic chamber 55, which communicates by one outlet with the boiler 100. The hydrodynamic chamber 55 communicates by its first outlet with the physical block 71, by its second outlet with the chemical block 72, and by its last outlet with the biological block 73, for example. It is understood that there can also be more of these technical blocks 71, 72, 73. If the medium 9 is crude oil, block 71 can be physical, block 72 can be a refinement block, and block 73 can be an evaporation or distillation block, and so forth. The embodiment of the negative electrode 3 can be of any kind, depending on the type of medium (anionic or cationic) being processed, which can be liquid or gaseous.

Figure 7:
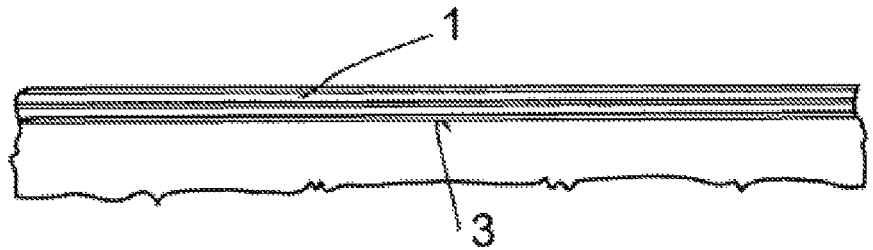
FIG. 7 shows a basic version of the body in which the negative electrode is in contact with the medium.

The general embodiment forms a layer, a coating, over the entire circumference along the chamber of the body 1 (FIG. 7).

Figure 8:
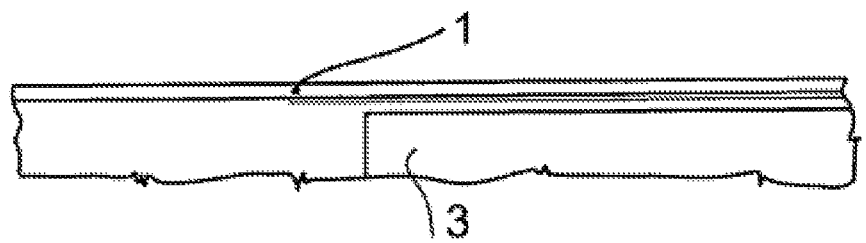
FIG. 8 shows a variant in which the negative electrode is disposed on only part of the body.

FIG. 8 shows an embodiment in which at least a part of the body 1 is covered by the electrode 3 or by the positive and/or negative electrochemical potential equal to zero.

Figure 9:
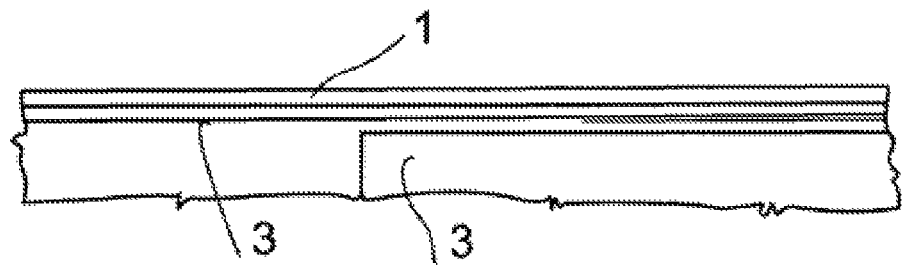
FIG. 9 shows a variant with a secondary negative electrode with various potentials.

The version of the electrode 3 in which two layers with different electrochemical potentials are in superficial contact with one another is shown in FIG. 9.

Figure 10:
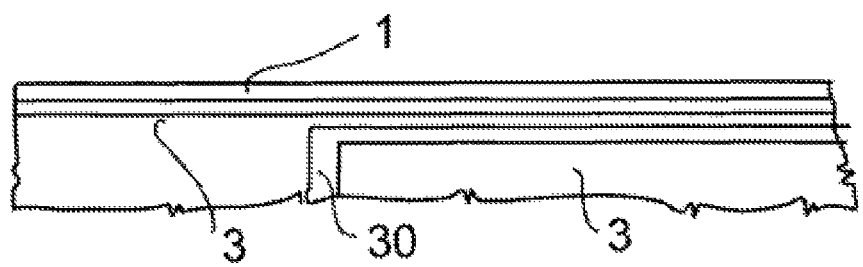
FIG. 10 shows a variant with an insulation layer between the negative and the secondary negative electrode.

In FIG. 10, a version identical to FIG. 9 is shown, except that between the electrochemical potentials there is a peripheral insulation layer 3.0.

Figure 11:
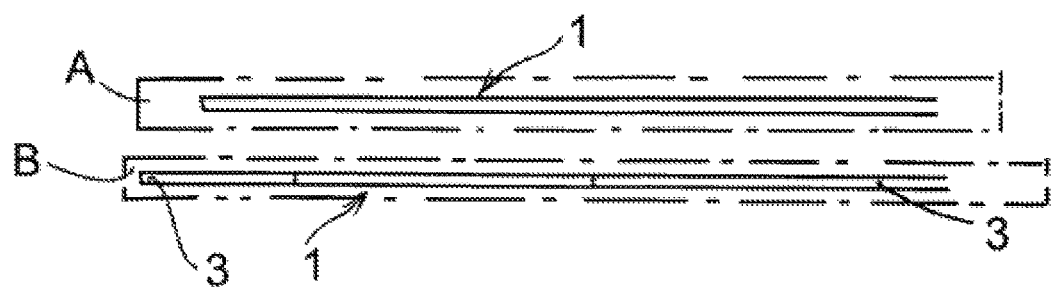
FIG. 11 shows a variant with a different negative electrode.

FIG. 11 shows a body 1 with an electrochemical potential equal to zero. The body 1 comprises one part which has an electrochemical potential equal to zero or is of an insulating material, and secondary parts that have a negative or positive electrochemical potential and that simultaneously replace the electrode 3.

Figure 12:
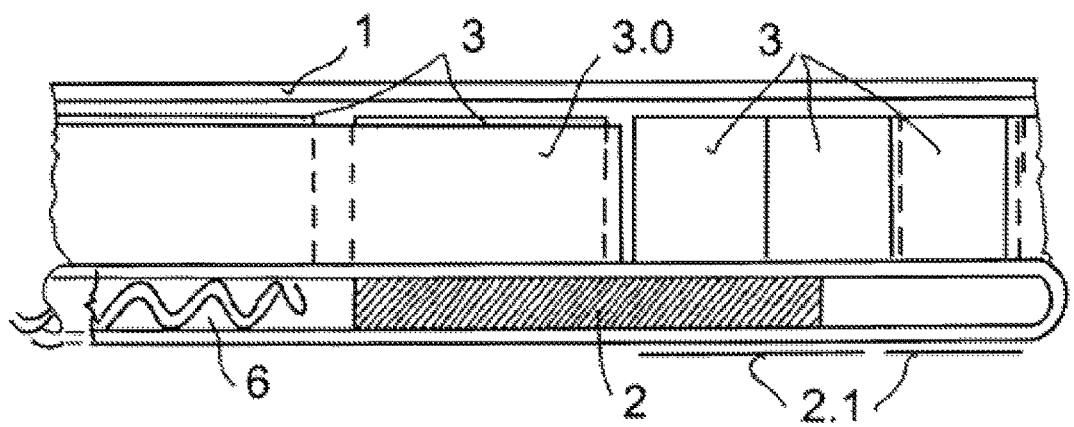
FIG. 12 shows a variant with the association of the negative electrode with the controlled electrode, which is separate from the positive electrode and the medium.

FIG. 12 shows an integrated controlled electrode 6 and a polarized electrode 2, which are disposed separately from one another in a common silicate pipe, which on its outer surface has at least one outer coating, the insulation layer 2.1 with a positive and/or negative electrochemical potential. FIG. 12 shows other possible exemplary embodiments of the electrode 3, the layers of which touch each other, are separate from one another, or cover each other.

Figure 13:
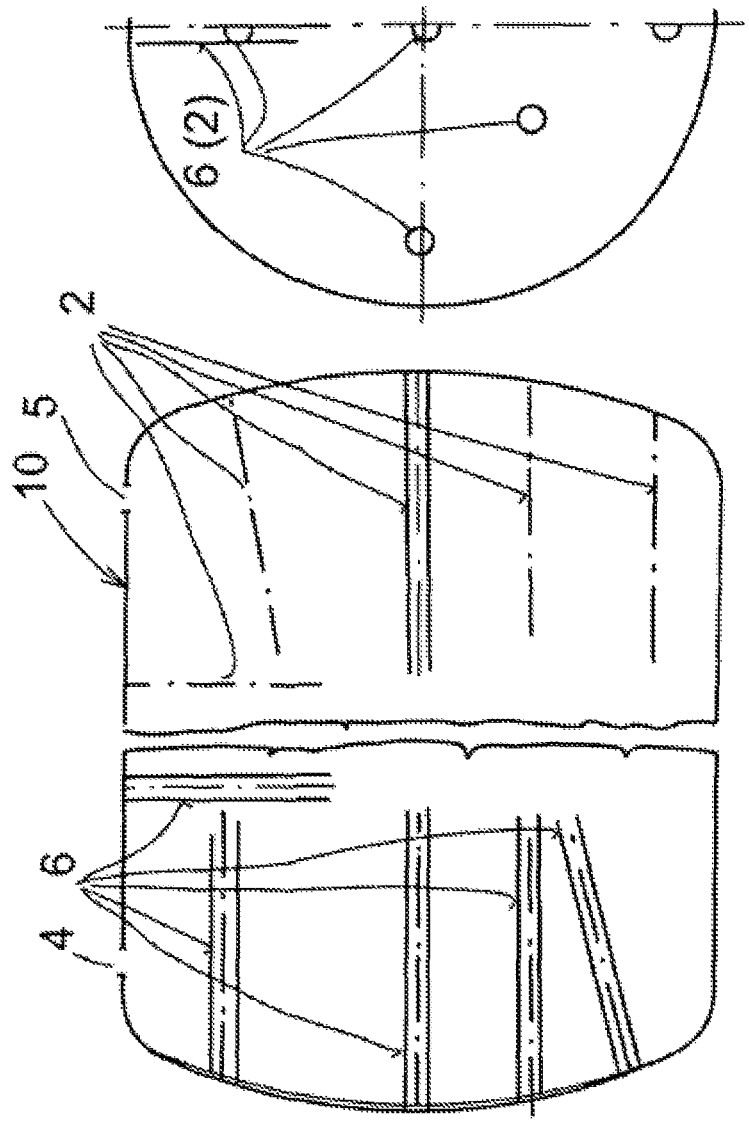
FIGS. 13 and 13A show a large-volume heating device with a controlled electrode and a positive electrode in two variants.
Figure 13A:
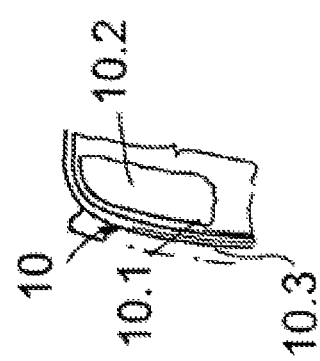

The excitation device 10 for liquids and gases in the form of a large-volume heating device is provided, on one side, in the vicinity of the inlet opening 4, with one or more controlled electrodes 6 and in the vicinity of the outlet opening 5 with one or more polarized electrodes 2. It is advantageous if the interior of the body 1 has an insulation layer 10.2, preferably whenever the body 1 is formed of a load-bearing, conductive material 10.1. It is advantageous in this case if the body 1, on its outside, has at least one technical layer in the form of thermal insulation and/or a back-reflector for electromagnetic radiation, for instance in the form of an aluminum foil or the like (FIGS. 13, 13A).

Figure 14:
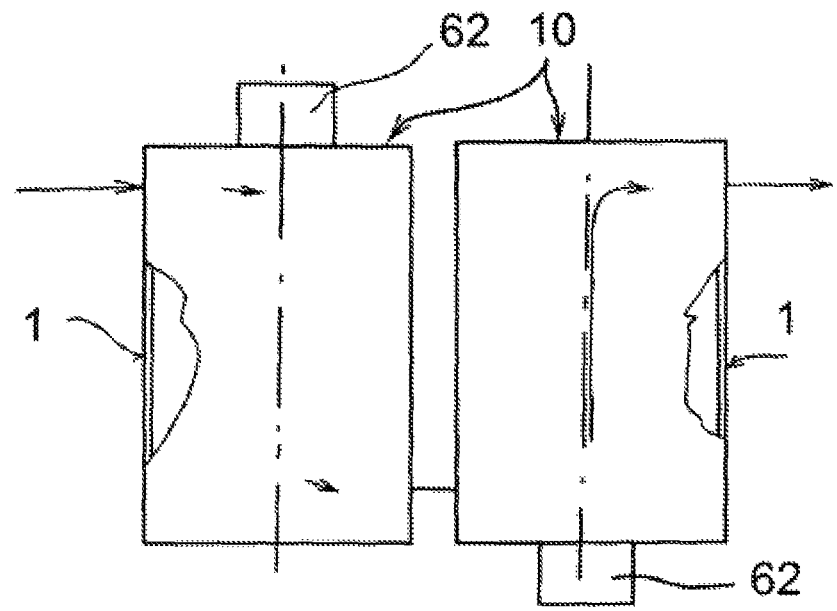
FIG. 14 shows the lineup of a plurality of excitation devices.
Figure 15:
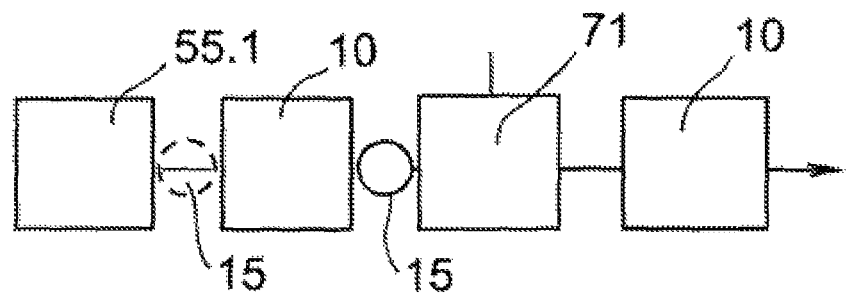
FIG. 15 is a block diagram of the excitation device in a vehicle, with a conveyor device for the medium.
Figure 16:
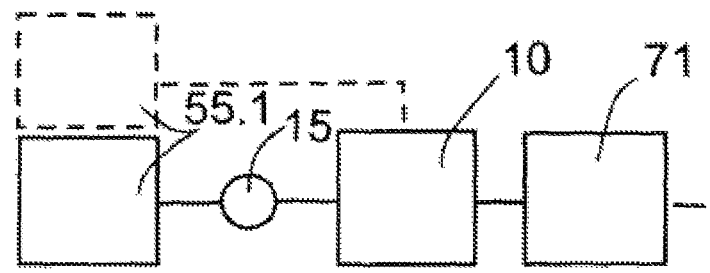
FIG. 16 shows a variant of the excitation device of FIG. 15.
Figure 17:
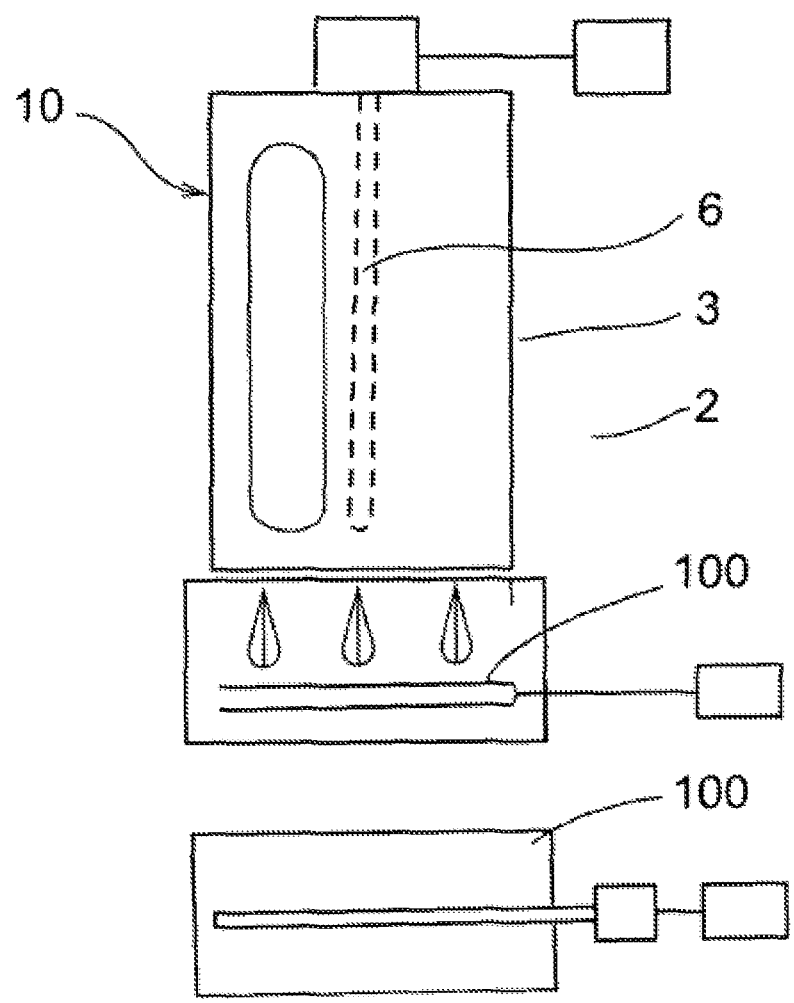
FIG. 17 shows a variant with a vertical orientation of the electrodes.

The passage of the medium through the excitation device 10 multiple times can be implemented with the aid of the conveyor feed device 15. A further concrete embodiment can be attained by lining up the excitation devices 10 in succession (FIG. 14). Passing the medium 9 a single time through two excitation devices 10 enhances its technological effects.

The electrode 3 is anionic or cationic, depending on the type of material with which it ionizes. The physical liquid or the gas as the medium 9 is influenced thereby. In an alternative version, if it polarizes the medium 9, the electrode 3 has an insulation layer 3.0 on the anionic or cationic material. This electrode 3 is the subject of further research. The polarized electrode 2 can have test tubes of anionic or cationic material in the interior of the silicate pipe and is likewise the subject of further research with regard to its interactions with the chemical composition, physical properties, and the like, of the medium 9.

The method according to the invention is the subject of further research. At this time, one can draw the conclusion that, if the electrode 3 is of a material with negative electrode potential (negative electrochemical potential—cathode), such as Fe, Al through lithium (−3.04 V) and compounds and mixtures thereof, then reduction processes take place in the medium 9. These versions have been tested in terms of energy economy. If the electrode 3 is of a material with a positive electrode potential (positive electrochemical potential—anode), such as Cu, Ag through gold (1.55 V) and compounds and mixtures thereof, then oxidation processes occur in the medium 9. These versions have been tested in technologies for wastewater purification, biogas processing, and the like. The polarized electrodes 2, and in particular their interactions upon changes in the medium 9, are likewise the subject of further research. The polarized electrode 2 in the interior of the silicate pipe can have test tubes of anionic or cationic material and is likewise the subject of research with regard to its interactions with the chemical composition of and the physical changes in the medium 9.

Novel physical and chemical properties of the embodiment according to the invention have been investigated using the PO method, which is the subject of Slovakian patent SK 279429. The outcome of the investigation is as follows:

The molecules in the medium, after the treatment according to the invention, are more weakly bound in their molecular and intermolecular structure; the medium has increased fluidity and an altered surface tension; the creation of an electrical double layer in the medium is influenced; the electrical and chemical potential and the changes in the conditions for the electrical equilibrium affect the pH value and thus also the chemical compositions; the properties of the treated medium are dependent on the time of treatment, the thermal content/enthalpy, the absorption, which given the altered properties was measured by the Si occurring in the medium.

By experimental measurements, differences were found in the rate of evaporation and the rate of heating, as well as a drop in the energy consumption for heating and cooling the same medium.

In view of the high measured absorption of water that was processed according to the invention, in comparison to water that was not processed, the inventor ascertained the following, after processing for 30 seconds, using a laser (laser pointer and laser battery available on the market): After 110 hours, he performed a comparison of

- distilled water that was not processed,
- distilled water that was processed according to the invention, and
- distilled water that was processed according to the invention and was affected by the laser.

This involved heating of a standard volume from 50° C. to 60° C. with the following result: distilled water that was not processed with 4.5 MJ/kg, distilled water which was processed according to the invention with 4.1 MJ/kg, and distilled water that was processed according to the invention and was affected by the laser with 3.7 MJ/kg.

The above was confirmed by experiments during cooling, which confirmed a substantially shorter time until the onset of nucleation for the water processed according to the invention (performed by WSL, Institute for Snow and Avalanche Research SLF, Davos, Switzerland). From the change in the bonds between the molecules and in the molecules, an optimized heat transfer and a change in the thermal conductivity in the medium can be observed. The energy required for freezing can be transmitted faster, or at a lesser temperature gradient.

Measurements were performed for the use of distilled water, which had been processed according to the invention, for the electrolysis of water; a faster reaction and a drop of 28% in the cost for the power supply were measured.

Tests with biogas preparation were performed; after the preparation according to the invention, there was an increase of 17% in the calorific value of biogas.

The tests were performed using an electromagnetic alternating signal and a steadily sinusoidal electromagnetic signal, a continuous signal and an intermittent signal of 100 to 500 MHz; work was done using a 0.1 to 100 W controlled electrode, a polarized electrode of technical glass and oxide ceramic with a filler of Cu, Ag, Al, C, Mg, and an ionized electrode of stainless steel, Zn, Sn, Fe, Cu, C and coatings, layers of W, Cr, Mo, and their carbides, nitrides, silicides, and multilayer structures and connecting structures.

By means of the method of the invention, the methane gas that was bound in the well water was eliminated, which confirms a weakening of the bonds.

The possible uses are dictated by the magnitude of the changes in the physical properties of the liquids and gases that flow through the apparatus. The changes are proportional to the number of passages through the electrochemical potentials and using the controlled electrode. This relates to the drinking water and industrial water processing industry, technical waters and wastewater, construction, spas and medicinal springs, dry cleaning and laundry services, the food industry, alcohol production, brewing, the health field, dermatology, ceramics production, heat generation, heat economy, water purification plants, energy economy, water sources, swimming pools, etc. The method for processing liquids can be employed for processing in the crude oil industry and the automotive industry.

The method according to the invention also interacts and acts on solid substances either intentionally or by their mere presence in liquid or gaseous media in the form of impurities. The method for processing can be employed in a liquid or gaseous state, and from moisture to liquid state, among other things, and may be present in a gaseous state, and in turn, free or bound gas may be present in the liquid. Accordingly, what is involved is the action on a compound of a solid, liquid or gaseous medium, in which the liquid state prevails at some times and the gaseous state at others. This method can be employed in the environmental field, especially in the combustion of solid fuels.

What is claimed:

1. An apparatus for performing a method for physically processing and heating media, namely liquids, in the form of an excitation device comprising:
   a body (1) with a peripheral insulation layer;
   a negative electrode disposed on an inner surface of said body;
   at least one controlled electrode (6) connected to a frequency source (6.2), by way of a holder (6.1); said frequency source (6.2) is in turn connected to an energy source (6.3);
   a transmission device (64) in the shape of a rod or spiral disposed in the at least one controlled electrode, and inserted into a silicate, silicon, or quartz glass pipe, said transmission device is connected to the frequency source;

at least one positively polarized electrode (2);

an inlet opening (4) disposed laterally of the body (1) and an outflow opening (5) disposed at an axis of the body(1); and a closure plate of insulating material to enclose the body and secure said body to a curve.

2. An apparatus for performing a method for physically processing and heating media, namely liquids, in the form of an excitation device comprising:

an integrated body comprised of a first body forming a chamber of a controlled electrode, and a second body forming a chamber of a positively polarized electrode;

an inlet opening disposed on an axis of the chamber of the controlled electrode;

a lateral outlet opening and an auxiliary inlet opening disposed on the chamber of the positively polarized electrode;

said chambers linked to each other in the integrated body by way of a communication opening;

said controlled electrode and positively polarized electrode are disposed in an axis of the integrated body;

a closure plate to enclose the integrated body and secure said integrated body to a curve;

a transmission device (64) in the shape of a rod or spiral disposed in the at least one controlled electrode, and inserted into a silicate, silicon, or quartz glass pipe;

said transmission device is connected to the frequency source;

at least one positively polarized electrode disposed on a holder disposed on the closure plate;

at least one sludge opening and at least one outer closable drain opening disposed on the integrated body; and a cylindrical filter disposed on a circumference of the integrated body.

3. An apparatus for performing a method for physically processing and heating media, namely liquids, in the form of an excitation device comprising:

a body with at least one controlled electrode (6) and at least one positively polarized electrode (2); said body either being made of an insulating material and has a negative electrode (3) on its inner surface, or having a peripheral insulating material on its inside surface; said body comprises a closable air and gas exhaust (7) and a closable sludge drain (8), at least one heating module or at least one heat exchanger disposed in an interior of said body; said at least one heat exchanger having an inlet opening and an outlet opening; and the at least one controlled electrode connected to a frequency source, which is connected to an energy source; said energy source is connected electrically to a conveyor feed pump of a medium and to said at least one heating module or at least one heat exchanger; said conveyor feed pump communicates by output with the interior of said body at points where the at least one controlled electrode is disposed in a holder, while input into the conveyor feed pump from the interior of said body takes place at points where the at least one positively polarized electrode is disposed.

* * * * *